United States Patent [19]

Soma et al.

[11] Patent Number: 4,739,315
[45] Date of Patent: Apr. 19, 1988

[54] X-Y INPUT DEVICE

[75] Inventors: Masahiro Soma; Junichi Hosogoe, both of Miyagi, Japan

[73] Assignee: Alps Electric Co., Ltd., Japan

[21] Appl. No.: 900,501

[22] Filed: Aug. 26, 1986

[30] Foreign Application Priority Data

Aug. 31, 1985 [JP] Japan ............................ 60-132438[U]

[51] Int. Cl.[4] .............................................. G09G 1/00
[52] U.S. Cl. ................................. 340/710; 74/471 XY
[58] Field of Search ..................... 340/710, 709, 706; 178/18, 19, 20; 74/471 XY, 198; 200/340, 6 A, 330, 339, 295, 335, 296; 273/148 B; 178/18; 33/1 M

[56] References Cited

U.S. PATENT DOCUMENTS

| | | | |
|---|---|---|---|
| 3,835,464 | 9/1974 | Rider | 74/198 |
| 3,941,023 | 3/1976 | Thomas et al. | 200/340 |
| 4,464,652 | 8/1984 | Lapson et al. | 340/710 |
| 4,613,853 | 9/1986 | Hosogoe et al. | 340/710 |
| 4,652,871 | 3/1987 | Tsukada et al. | 340/710 |

*Primary Examiner*—John W. Caldwell, Sr.
*Assistant Examiner*—Alvin Oberley
*Attorney, Agent, or Firm*—Guy W. Shoup

[57] ABSTRACT

An X-Y input device comprises a position sensor, a switch for use in signal processing of the position sensor, and a switch lever actuatable by pressing by the finger the outwardly-projecting key portion to operate the switch to become closed and opened, and a case consisting of a bottom plate and a cap mounted thereon and adapted to hold the switch and switch lever. The input device further comprises posts on the bottom plate, each post supporting the associated switch lever at an intermediate site between the key portion at one end of the switch lever and the abutment portion for abutting against the undersurface of the top wall of the cap at the other end, so that the switch lever can be resiliently flexed by pressing the key portion. These features of the invention enables reaction of the key portion to finger's pressure to remain constant and makes installation of the switch lever simpler.

3 Claims, 8 Drawing Sheets

X-Y INPUT DEVICE

BACKGROUND OF THE INVENTION

1. The Field of the Invention

This invention relates to an X-Y input device, and more particularly to an X-Y input device useful for a graphical display unit.

2. Description of the Prior Art

The graphical display unit is composed essentially of a display screen, a display controller, a data channel and an input device. Various types of input devices are known, and one of them is of "JOISTIC", a registered trade mark. When a lever supported by means of gimbal mechanism is tilted in an intended direction by hand, it detects the derection and tiltangle and then generating voltages or X- and Y-components or the corresponding digital signals. This input device has drawbacks of limited swing range of the lever and unreliable stability of input signals.

To eliminate these drawbacks, recently the so-called mouse has been developed as an input device, which comprises basically a rotatable ball as a steel ball rotatably supported, (which is referred to as "ball" hereinafter), a first roller follower driven by the ball through the utilization of friction between both, a second roller follower driven likewise by the ball through the friction between both, their axes being mutually perpendicular and intersecting, first and second detectors each consisting of a variable resistor and an encoder and adapted to detect rotation quantity of the associated roller follower, and a case holding the ball, first and second roller followers, and first and second detectors for detecting rotation quantity. The term "roller follower" is referred to as "follower" below. The case is provided with an opening through which a lower part of the ball projects downwards. As the ball is caused to roll on a specified flat surface, with hand at the case, towards an intended point, the first and second followers rotates in definite derections. Then directions and rotation quantity of the followers are detected by the first and second detectors as voltages of the X- and Y-components or the corresponding digital signals, which are input to a display unit of the system.

DESCRIPTION OF A PRIOR ART EXAMPLE

Figure 5:
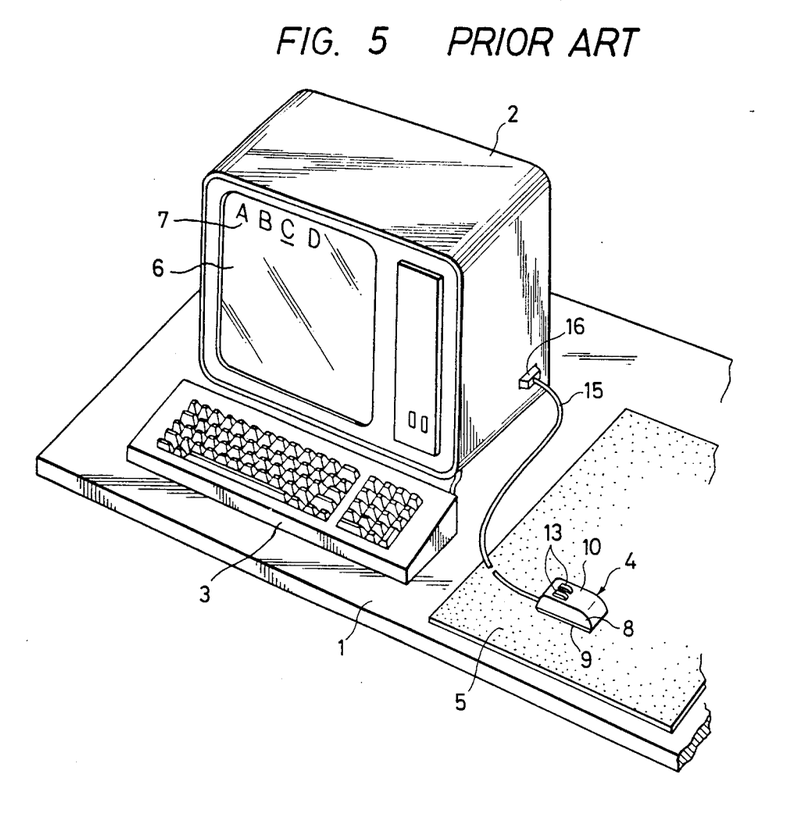
FIG. 5 is a perspective view of a conventional graphical display unit including a prior art X-Y input device.

In the following, and X-Y input device as an example of prior art in which the so-called mouse is employed as an input device for graphical display unit will be described with reference to the drawings:

Referring to FIG. 5 which is a perspective view of the whole graphical display unit including an X-Y input device involved in the example, there are on a table 1 a display unit 2 comprising a screen controller, a data channel and others, a first input device 3 with function keys, and a second input device 4 according to the invention. The second input device 4 can be manipulated to move about on an exclusively-used sheet 5 on the table 1, and in conformity to the movement, for example, a cursor 7 is positioned as desired on the screen of the display unit 2.

Figure 6:
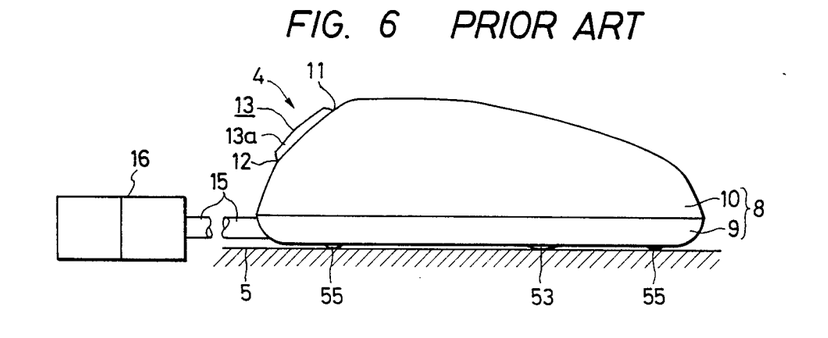
FIG. 6 is a side view of the prior art input device.

FIG. 6 is a side view of the second input device 4.

The case 8 of the second input device 4 consists of a bottom plate 9 and a cap 10 mounted thereon in step interengagement between them throughout their all-over circumference for the preventing dust and water from coming into the case 8 via the joining boundary between them. The case components are molded products of ABS resin.

The cap 10 is of a size allowing the second input device to be manipulated by the hand, and has at a definite site of the upper front wall portion 11 a through holes 12 extending longitudinally and inwards. Rectangular switch levers 13 are inserted from the inside in the through holes 12 with their actuation end portions 14 somewhat projecting out of the upper wall 11.

Under the switch lever 13, push switches are disposed to be placed in engagement with the switch lever (13), as described later. The switches are used, in addition to the switching function for the input device 4 itself, for various signal processings for example, on the screen of the display unit 2, for deleting a part indicated by the cursor 7 of a displayed pattern, for moving it to arbitrary positions, and for other switchings or controls. The second input device 4 is connected through a cord 15 and a plugged-in connector 16 to the display unit 12.

Figure 7:
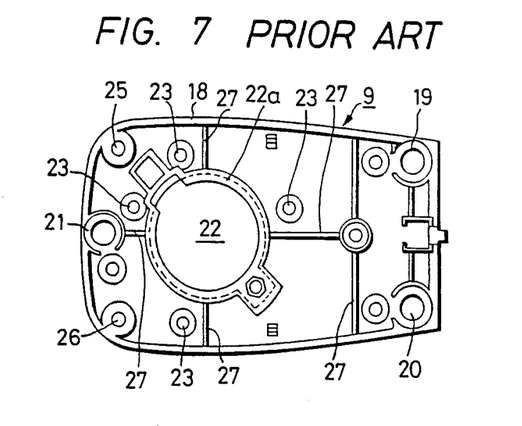
FIG. 7 is a top view of the bottom plate.
Figure 8:
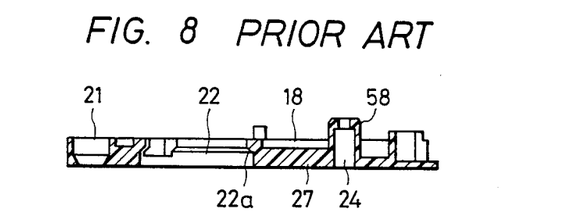
FIG. 8 is a front sectional view of the bottom plate.
Figure 9:
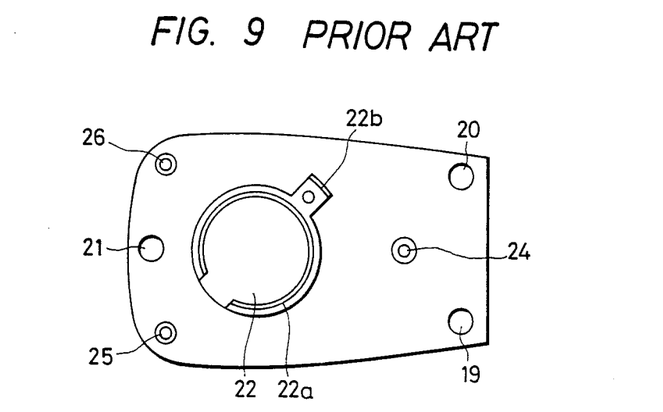
FIG. 9 is a bottom view of the bottom plate.

FIGS. 7 through 9 are plan, cross-sectional and bottom views, respectively. On the bottom plate 9, there is a continuous circumferential standing wall 18 provided with small bores 19, 20 and 21 at the corners of the front and the middle of the rear, respectively. They are so located that an isosceles triangle is formed by the lines interlinking between their centers.

There is provided at the center of the bottom plate 17 a center hole 22 of a large diameter, and having an annular elevated portion 22a and a rectangular notch 22b at the lower edge of the center hole 22, and threaded holes 23 at four locations along the circumference of the center holes 22.

The bottom plate 9 is additionally provided with threaded holes 24, 25 and 26 at the fore center and rear corners, respectively. Solid reinforcement ribs 27 are arranged as desired among the threaded holes 24, the center hole 22 and the circumferential wall 18.

Figure 10:
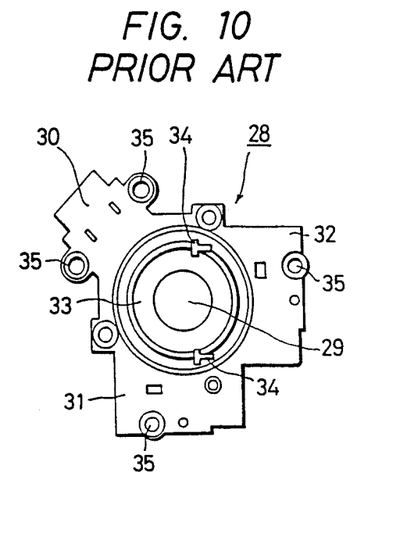
FIG. 10 is a top view of the annular holder.
Figure 11:
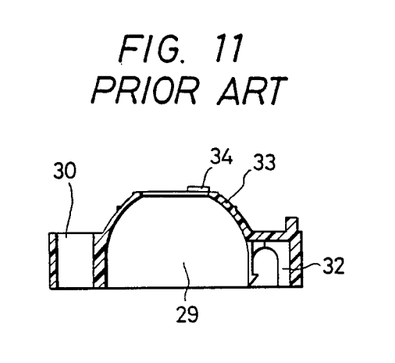
FIG. 11 is a front sectional view of the annular holder.
Figure 12:
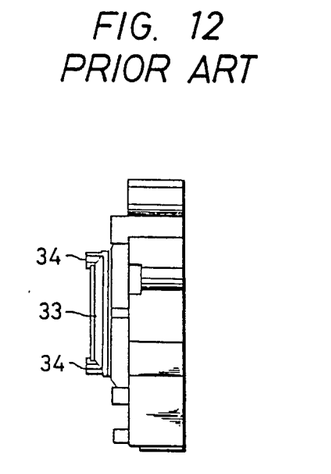
FIG. 12 is a side view of the annular holder.

FIGS. 10 through 12 which are plan, front and side views, respectively, of an annular holder 28 for holding a ball which will be described later.

This annular holder 28 is a monoblock casting of synthetic plastic provided with a through hole 29 at the center having a larger diameter than that of the ball and three chambers 30, 31 and 32 along the circumference of the through hole 29. The chambers each having an opening facing the through hole 29 and adapted for holding and positioning the first and second followers and the urgence roller which will be described later.

The annular holder 28 has a protective dome-shaped cover 33 solidly formed over the through hole 29, which is of use for preventing the ball from too playing in the through hole. There are disposed on the protective cover 33 as the tops of the annular holder 28, as illustrated in FIG. 11, two T-shaped projects 34 which serves as seats on which the switch levers 13 are mounted at the undersurface.

In FIG. 10, there are found four threaded holes 35 at either side of the chamber 30 and at the ends of the chambers 31, 32. By screws through these and the threaded holes 23 of the bottom plate 9, the annular holder 28 and the bottom plate 9 are fixedly united together.

Figure 13:
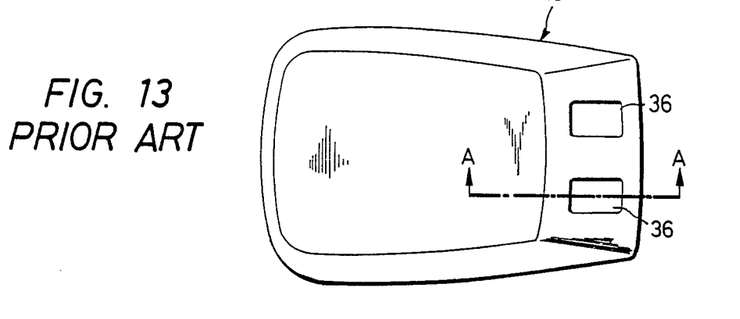
FIG. 13 is a top view of the cap.
Figure 14:
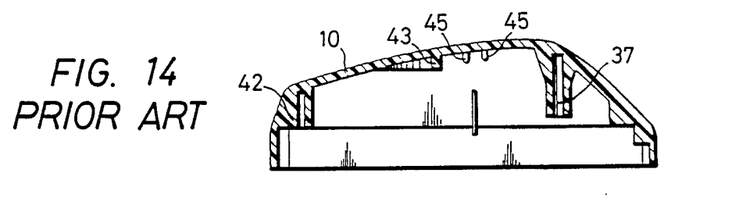
FIG. 14 is a front sectional view of the cap.
Figure 15:
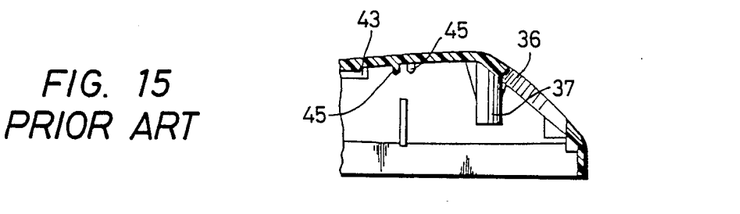
FIG. 15 is a cross-sectional view taken along line A—A of FIG. 9.
Figure 16:
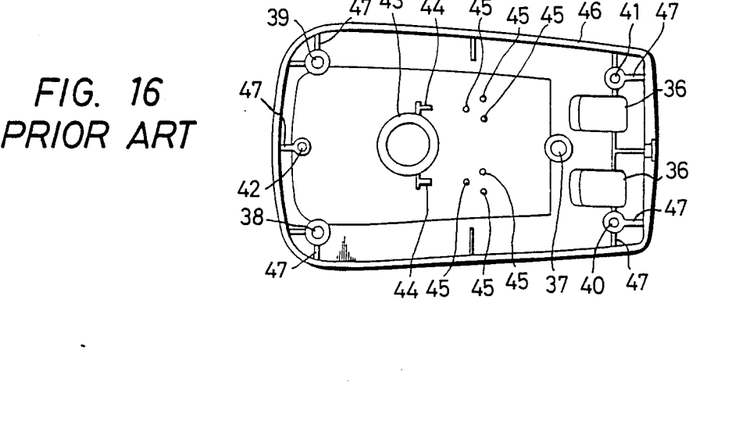
FIG. 16 is a bottom view of the cap.

FIGS. 13 and 14 are plan and elevational views of a cap 10. FIG. 15 is a view taken along line A—A of FIG. 9. FIG. 12 is a bottom view of the same.

The cap 10 has the arched top wall 11, which is provided with two windows 36 formed at the front, through which the key portions of two switch levers 13 to be actuated are projected. The top wall 11 is provided on the inner surface with threaded holes 37, 38, 39 at corresponding locations to those of the threaded holes 24, 25, 26 of the bottom plate 9 and three hollow bosses 40, 41, 42 projecting inwards at the corresponding locations to holes 19, 20, 21 of the bottom plate 9.

The top wall further has on the inner surface an annular ridge 43 abutting against the upper surface of the protective cover 33 of the annular holder 28 and is of use as a reinforcement which forces downwards the protective cover having usually a thin thickness. At two locations along the circumference of the annular ridge wall, T-shaped pad portion 44 having the same form as those of the seats 34 at the corresponding locations are solidly formed, and in the vicinity of the pad portion 44 the one ends of the switch levers 13 fixedly fastened with three rivet pins are retained between the pads 44 and the seats 34.

Between surrounding wall 46 and bosses 40, 41, 42 or threaded holes 37, 38, 39, reinforcement ribs 47 are solidly formed.

Figure 17:
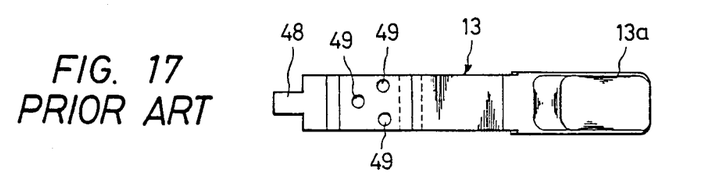
FIG. 17 is a top view of the switch lever.
Figure 18:
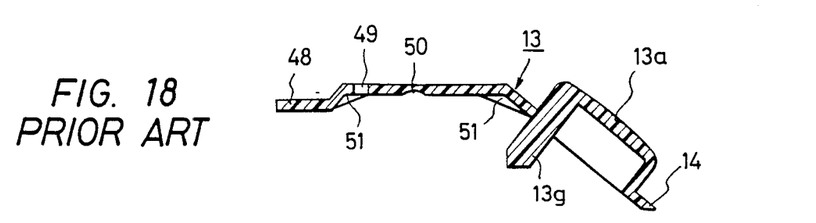
FIG. 18 is a front sectional view of the switch lever.
Figure 19:
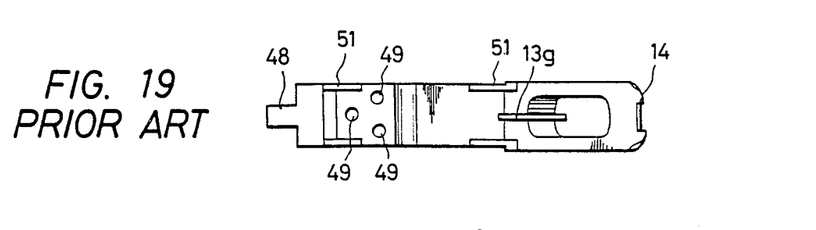
FIG. 19 is a bottom view of the switch lever.

FIGS. 17, 18 and 19 are plan, elevational and bottom views of the switch lever 13.

The switch lever 13 is a monoblock molded product of synthetic resin having as the whole a nearly dogleg-like form in longitudinal section. It has at the fore end portion a reversed-U shaped, and oblique-positioned position 13a to be actuated, of which the fore leg portion projects obliquely downwards, (The project is designated by a character 13g) and at the rear end a somewhat narrow portion or tag 48 to be sandwiched. It is provided with the three bores 49 somewhat before the tag portion 48. Also a thin-walled zone 50 is found somewhat behind the bores 49. The other or rear leg of the reversed-U shaped portion 13a is flanged. The flange is designated with a character 14, and abutted against the window 36 of the cap 10 as a stop to the returning action of the switch lever 13. To the folded portion of the switch lever 13, a reinforcement rib 51 is applied.

Figure 20:
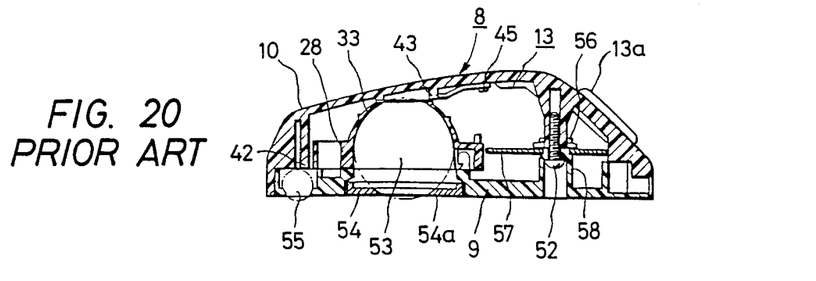
FIG. 20 is a sectional view in whole of the input device in assembled state.

Referring to FIG. 20 of the input device 4 in assembled state shown in a longitudinal sectional view, in which the cap 10 is integrated with the bottom plate 9 by screws 52 passing through the bores 24, 25, 26 and screwed in the threaded holes 37, 38, 39. At the middle portion of the case 8 consisting of the cap 10 and the bottom plate 9, there is disposed a rotatable steel ball 53 which is fitted in the center hole 22 of the bottom plate 9 and supported by the annular elevated portion 22a. The ball is also held in the case 8 by means of a lid 54 fixedly fastened with screws (not shown) and the annular holder 28 with the lower end portion downwards protruding through the opening 54a of the lid 54. Thus the ball 53 is rollable in X-Y directions on the flat surface while freely rotating in the through hole portion 29 of the ring holder 28.

In the three holes 19, 20, 21 of the bottom plate 9, small balls 55 are held and limited the upward displacement by means of the bosses 40, 41, 42 of the cap 10. They are held with their lower part somewhat protruding from the bottom plate 9.

As described above, the switch levers 13 are firmly attached at the near to the rear end by the rivet pins 45. To achieve the attachment, the three rivet pins 45 are caused to pass through the small bores 49 and then their ends are fused and pressed. Thus the switch lever 13 is in virtue of its elasticity, flexible about the pin-fastened spot as a fulcrum by actuation with the finger at the reversed-U shaped portion 13a. As understood from FIG. 21, the tag end, 48, of the switch lever 13 located near the pin-fastened spot is retained between the seat 34 on the top surface of the annular holder 28 and the pad 44 on the top-wall undersurface of the cap 10 so that even if the pin-fastening gets loose, flection of the switch lever 13 is accomplishable about the pin-fastened spot as a fulcrum.

Referred to FIG. 20 illustrating the entire input device, the input device operated by the above-mentioned switch lever 13 operates a push switch 56, which is installed on the supporting plate 57 mounted on the boss 58 of the bottom plate 9. The top surface of the push switch 56 is opposite to the depressing project 13g of the switch lever 13 so that if the switch lever 13 is pushed down at the reversed-U shaped portion, the push switch 56 responds through the depressing project 13g abutting against it to make switching action.

In the design, it is considered that there is normally a slight spacing between the protective dome-shaped cover 33 of the annular holder 28 and the surface of the ball, not to cause trouble with the rolling of the ball 53, and the cover 33 serves to limit the movement of the ball and protect the surface of the ball 53 and the cap 10 in an accident associated with the input device, for example, lateral turning or falling out of the supporting plate. It is essential to accurately detect rotation quantity of the ball 53, which is required for this to be such as a steel ball heavy and having a high-precision surface. Collision of such a ball against the inner wall of the case if it occurs frequently, does damage of the surface, resulting in varying detection of rotation quantity. This is the reason that there is provided over the ball the dome-shaped protective cover 33 having a similar curvature to that of the ball 53.

Figure 22:
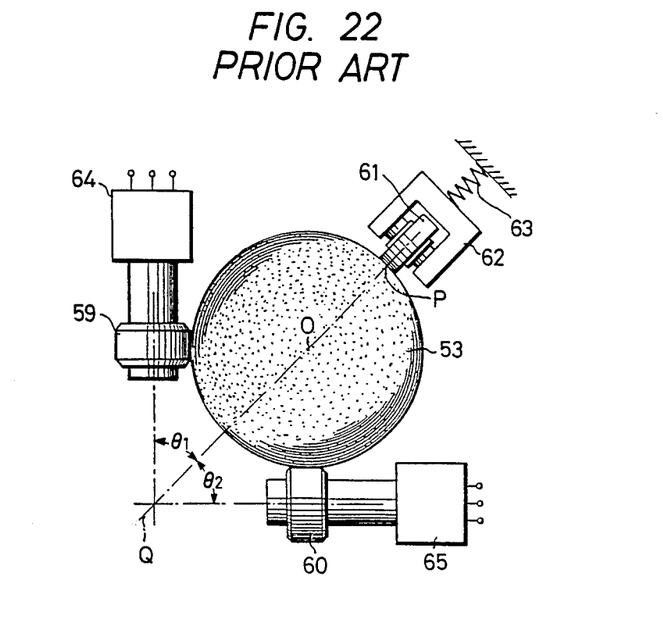
FIG. 22 is a cross-sectional view illustrating the principle of detecting the rotation quantity of the prior art input device.

The fundamental of detecting rotation quantities involved in the input device embodying the invention will be described with reference to FIG. 22 below:

The first and second roller followers 59 and 60 having the relationship between their rotation axes perpendicularly to each other are frictionally driven by the ball 53 under the urging action of the urging mechanism which comprises a spring 63 as an urging source, a roller 61 abutting against the surface of the ball 53, and a roller case 62 holding the roller 61. The roller 61 of the urging mechanism is located to aligned with the intersection "Q" of the axes of the first and second followers 59 and 60 and the center of the ball 53, and thus the followers 59 and 60 are affected with equal friction by the urging mechanism.

Each follower 59 or 60 has a first or second sensor 64 or 65 for detecting by means of an encoder or rotary rheostat the rotation quantity of the follower, in particular as X- and Y-components, thus actual situation of rotation of the ball 53 being caught.

Figure 21:
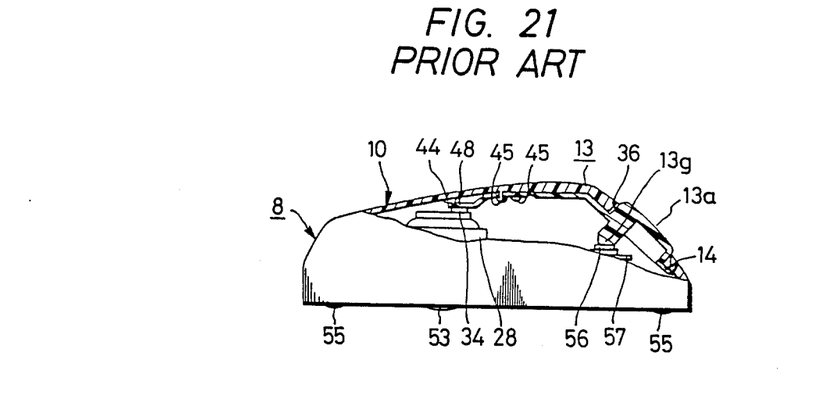
FIG. 21 is a front partially-sectional view illustrating the mounting state of the switch lever.

The X-Y input device is designed in such way that the protruding ends of the rivet pins 45 passing inwards from the cap 10 through the small bores 49 of one switch lever 13 are fused and pressed, and the rear end 48 of the switch lever 13 is fixedly retained between the seat 34 in the top surface of the annular holder 28 and the pad 44 on the undersurface of the cap 10, and thus the switch lever is caused to act without fail. A problem however is encountered in the design that when reduction in tightness or looseness of the pin-fastening occurs, the switch lever 13 can be actuated with an erroneous touch. Another problem arises that indispensable pressing of the protruding ends of the pins brings about increase in assembly cost. Further disadvantage resides in that the necessity of providing the pads 44 attached to the cap 10 and seats 34 mounted on the annular holder 28 leads to structural complification.

SUMMARY OF THE INVENTION

In view of the circumstances of prior art described above, it is the principal object of the invention to provide a X-Y input device of simplified structure with a reliable switch lever actuable always normally without losing the operativeness.

The object has been accomplished by the construction according to the invention that a X-Y input device comprises a position sensor, a switch for use in signal processing of the position sensor, and a switch lever actuatable by pressing by the finger the outwardly-projecting key portion to operate the switch to become closed and opened, and a case consisting of a bottom plate and a cap mounted thereon and adapted to hold the switch and switch lever, and has the function, when the input device is moved on a flat surface to an intended position, detecting the coordinates of the position and outputting signals to a central processor, and characterized in that it further comprises posts on the bottom plate, each post supporting the associated switch lever at an intermediate site between the key portion at one end of the switch lever and the abutment portion for abutting against the undersurface of the top wall of the cap at the other end, so that the switch lever can be resiliently flexed by pressing the key portion. These features of the invention enables reaction of the key portion to finger's pressure to remain constant and makes installation of the switch lever simpler.

DESCRIPTION OF THE PREFERRED EMBODIMENT OF THE INVENTION

An embodiment of X-Y input device according to the invention will be described with reference to FIGS. 1 through 4.

Figure 1:
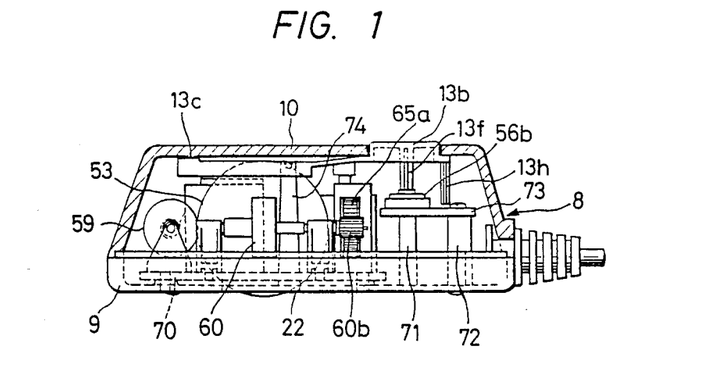
FIG. 1 is a longitudinal sectional view of an X-Y input device according to the invention.
Figure 2:
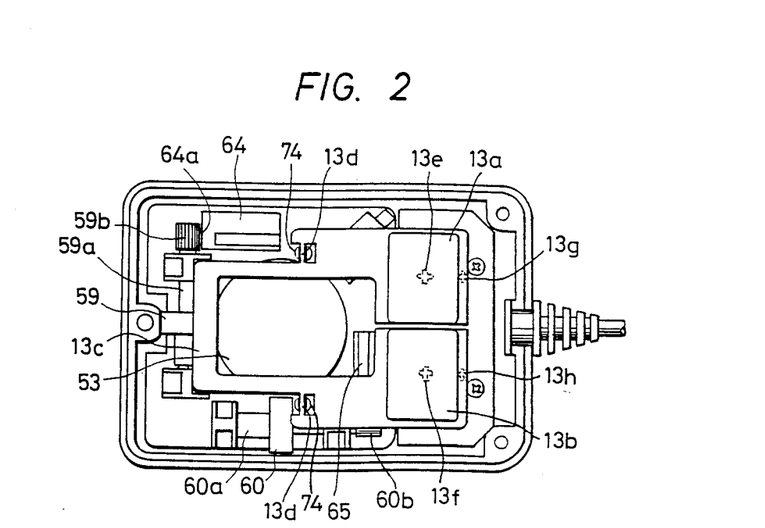
FIG. 2 is a plan view of the same with the cap taken off.
Figure 3:
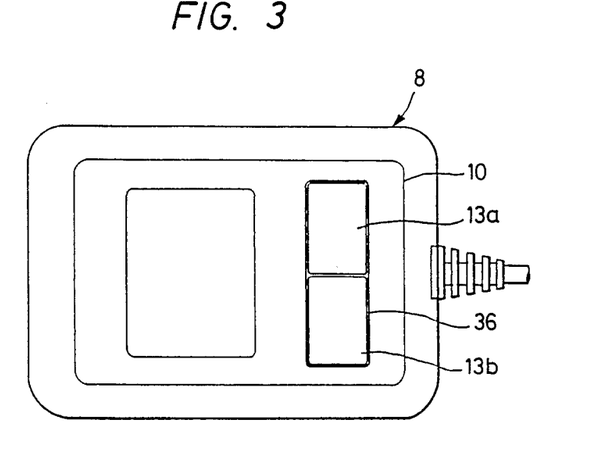
FIG. 3 is a plan view with the cap mounted.
Figure 4:
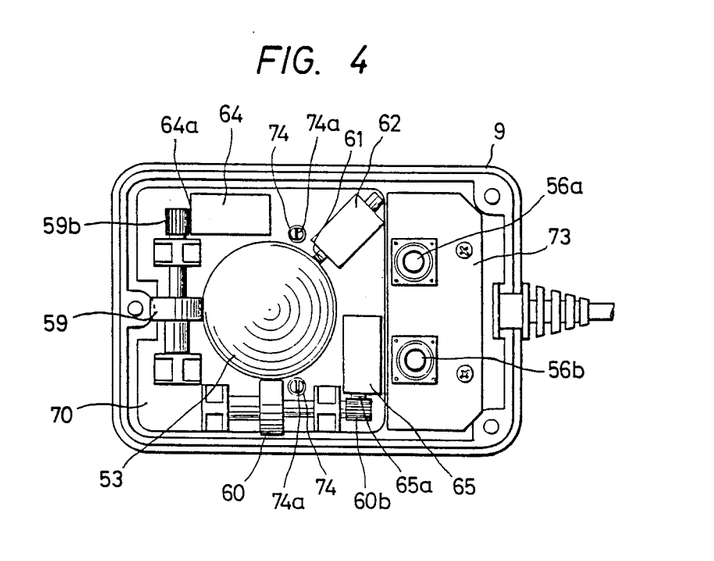
FIG. 4 is a plan view of the internal mechanism.

FIG. 1 is an overall longitudinal sectional view of the embodiment, FIG. 2 is a plan view of the same with the case cap removed, FIG. 3 is a plan view of the same with the case cap put in position, and FIG. 4 is a plan view illustrating the internal mechanism. Corresponding or identical parts or components in these drawings are designated by the same reference numerals compared with FIGS. 5 through 22.

Referring to FIGS. 1 through 4, a X-Y input device (referred to as mouse hereinafter) comprises essentially a bottom plate 9, a base plate 70 fixedly secured to the bottom plate 9, roller followers 59, 60 installed on the base plate 70, rotation quantity detectors 64, 65 each consisting of an encoder rotatable in accordance with the rotation of the followers 59, 60 and adapted for converting the rotation into electric quantity and a rotary rheostat, a rotatable ball 53 rolling on the flat surface while driving the followers, a push switchs 56a, 56b for controlling signal processing of rotation quantity detectors 64, 65, flexible switch levers 13 which operate the push switches 56a, 56b, and a cap 10 mounted on the bottom plate 9, both constituting a case holding the above-mentioned components.

The followers 59, 60 are mounted on the base plate with their rotation axes mutually perpendicular and intersecting. The ball 53 is in part protruded downwards through the opening 22 to be rollable on the flat surface. The followers 59, 60 are placed in frictional contact with the ball 53 under the action of the urging mechanism including a roller 61, a roller case 62 and a spring 63. Each follower 59 or 60 has a rotational shaft carrying a gear 59b or 60b fitted thereon at one end, the gear being meshed with a reduction gear 64a or 65a, which in turn drives the rotation quantity detector 64 or 65. Thus the rotation angle of the follower 59 or 60 can be transmitted via the reduction gear 64a or 65a. As understood, the ball 53, followers 59, 60, rotation quantity detecters 64, 65, and others constitutes position detecting means. On a second base plate 73 supported by two legs 71, 72 upstanding on the bottom plate 9, the above-mentioned push switches 56a and 56b are mounted. There are provided a pair of posts 74 each having a emgagement groove 74a, and extending from the bottom plate 9 to the short of the cap 10.

On the other hand, each switch levers 13 are solid, elastic, substantially dog-leg shaped in plan view and made from synthetic resin. It has a separate key portion 13a or 13b for operating a push switch 56a or 56b at one end, a tab abutting against the top wall of the cap 10 at the other end 13c, and a locking lug 13d between the ends, which is to be brought into engagement with the engagement groove 74a of the aforesaid post 74. As illustrated in FIG. 1, the switch lever 13 is beared in such construction that at the rear end the upper surface of the tab 13c abuts against the undersurface of the top wall of the cap 10 and at the other end the key portion 13a or 13b are protruded upwards through the window 36 of the cap 10 and hence allowed to be pushed down against the upper end of the post 74. In this case, the locking lug 13d of the switch lever 13 is placed in engagement with the groove 74a at the upper end of the post 74, and nothing else, and thus if either of key portion 13a or 13b is pressed down, then it is gets relevantly flexed clockwise about the engagement groove 74a or locking lug 13d as fulcrum, thus the tag 13c abuts against the undersurface of the top wall of the cap 10. The reaction due to the elastic flexure of the switch lever 13 resulting from pressing down the key portion 13a or 13b is received by the wall of the cap 10 and the engagement groove 74 of the post 74. Then, owing to the post 74 which is rigid, the distance from the bottom plate 9 will not be changed. The distance between the tab 13c and the locking lug 13d is unchangeable. The reaction force on the finger due to the elastic flexure of the switch lever 13 caused by pressing down key portion 13a, 13d amounts to values correspondent to the flexture. Therefore if the flextures are equal, then the same reaction force always produced, and thus the finger sensitivity to the pressing is constant. The pressing action on the push switchs 56a, 56b is accomplished through the intermediation of depressing projects 13e, 13f on the undersurfaces of the key portions 13a, 13b. At the fore (righthand in FIGS. 1 and 2) end of the key portions 13a, 13b, the limiting tabs 13g, 13h for limiting the pressing stroke are formed, and abuts against the above-mentioned base plate before overstroke of the tabs 13e, 13f to prevent the push switches 56a, 56b from suffering damage due to it. If pressing against the key portion 13a or 13b is released, then the switch lever 13 returns by the action of the elasticity of itself to the original state where they projects through the window 36. Besides the other respects of mechanism and manipulation of mouse are the same as in the prior art example.

For assembling a mouse constructed as above-described, after installing the followers 59, 60 and the rotation quantity detectors 64, 65 at specified locations of the bottom plate 9, merely the locking lug 13d of the switch lever 13 is brought into engagement with the engagement groove 74a at the upper end of the post 74 to bear swingibly the switch lever 13 on the post 74, followed by fitting the cap 10 on. It is unnecessary to adhere or join the switch lever, which is the drive part, to other structural members or components, and thus there is no danger of poor or incomplete joining or adherence, and failures and abnormal reaction of the switch lever due to it. Further the mounting and nothing else is necessary, in other words, without needing any of the above-mentioned processes in the prior art: joining, adhering, and pressing, and this contributes to improvement in efficient assembly and reduction in manufacturing cost.

The invention described above can be applied, for example, in a non-mechanical detection type mouse, switch lever actuated by the utilization of light and support members for it may be used instead of the mechanical detection type mouse with a rotatable ball which is caused to roll about on a flat surface in the above-stated embodiment.

As described above, the construction according to the invention that there is provided switch levers each with a key portion at one end and an abutment tab at the other end, and swingably supported on the post upstanding on the bottom plate through a locking lug at some intermediate site utilized as a fulcrum of the switch lever, not only insures always a constant resilient reaction of the switch lever on finger's pressing but also takes effect of needing only mounting the switch lever on the upper post end to be brought into engagement with an engagement groove on the upper post end, contributing to simplified assembly. Further advantages reside in simplified structure needing the post and no other supports, decrese in cost resulting from this and the improvement in assembly.

What is claimed is:

1. An X-Y input device, which is moved on a flat surface to an intended position to sense relative X and Y coordinates of the position and output corresponding signals to a central processor, having a body casing including a bottom plate and an upper cap mounted thereon, a position sensor provided in the case, and at least one switch in the case for use in outputting the signals, and a corresponding switch lever which is mounted in the case with a key portion projecting outwardly from an opening in the case for pressing by a finger to operate the switch, wherein the improvement comprises:

said switch lever in the form of an elastic member extending in a longitudinal direction of the case having an abutment portion on one end, an intermediate portion including a pair of mounting members spaced apart on respective sides of the switch lever in a transverse direction perpendicular to the longitudinal direction of the case, and said key portion at an opposite end of the switch lever;

a pair of posts fixed on the bottom plate and having upper ends extending toward an undersurface of the upper cap of the case, the posts being spaced apart in the transverse direction for supporting the mounting members of the switch lever on their respective upper ends;

wherein the switch lever is mounted by its intermediate portion as a fulcrum supported on the pair of posts, and has the abutment portion abutting against the undersurface of the upper cap, such that the switch lever can be resiliently flexed when the key portion is pressed to provide a returning force for returning the key portion to its initial position when it is released.

2. An X-Y input device defined in claim 1 wherein said switch lever (13) is supported on each side by said post (74) and locked by the engagement between a locking lug (13d) thereof and an engagement groove (74a) on the upper end of said post (74).

3. An X-Y input device defined in claim 1 wherein a limiting projection (13g or 13h) for limiting the operation stroke of said switch is provided at the fore end side of the key portion (13a or 13b) of said switch lever.

* * * * *